US 9,351,255 B2

(12) United States Patent
Nakao

(10) Patent No.: US 9,351,255 B2
(45) Date of Patent: May 24, 2016

(54) PORTABLE INFORMATION PROCESSING DEVICE AND INFORMATION PROCESSING METHOD

(71) Applicant: FUJITSU LIMITED, Kawasaki-shi, Kanagawa (JP)

(72) Inventor: Manabu Nakao, Kunitachi (JP)

(73) Assignee: FUJITSU LIMITED, Kawasaki (JP)

( * ) Notice: Subject to any disclaimer, the term of this patent is extended or adjusted under 35 U.S.C. 154(b) by 30 days.

(21) Appl. No.: 14/289,907

(22) Filed: May 29, 2014

(65) Prior Publication Data

US 2015/0065110 A1 Mar. 5, 2015

(30) Foreign Application Priority Data

Aug. 28, 2013 (JP) ................................. 2013-176998

(51) Int. Cl.
*H04W 52/02* (2009.01)
*H04W 4/02* (2009.01)

(52) U.S. Cl.
CPC .......... *H04W 52/0254* (2013.01); *H04W 4/021* (2013.01); *H04W 4/028* (2013.01); *Y02B 60/50* (2013.01)

(58) Field of Classification Search
CPC ...... G01C 21/14; G01C 21/20; G01C 21/343; G01C 21/3446; G01C 21/3617; G01C 21/3484; G01S 5/0294; G01S 5/0252; G01S 5/0278; G08G 1/096888; G08G 1/096883; G08G 1/096833; G08B 1/08
USPC ................... 701/25, 410, 424, 426, 533, 541; 340/539.13
See application file for complete search history.

(56) References Cited

U.S. PATENT DOCUMENTS

| 2005/0251325 | A1  | 11/2005 | Kudo et al. |
| 2009/0201149 | A1  | 8/2009  | Kaji |
| 2010/0324819 | A1* | 12/2010 | Nurminen et al. ............ 701/213 |
| 2011/0313957 | A1  | 12/2011 | Ide et al. |
| 2013/0244686 | A1* | 9/2013  | Saha et al. ................. 455/456.1 |
| 2014/0094198 | A1* | 4/2014  | Heo et al. ................... 455/456.4 |
| 2014/0141796 | A1* | 5/2014  | Marti et al. ................ 455/456.1 |

FOREIGN PATENT DOCUMENTS

| JP | 2009-159336   | 7/2009 |
| JP | 2012-8659     | 1/2012 |
| WO | WO 2004/034725 | 4/2004 |

* cited by examiner

*Primary Examiner* — Christopher M Brandt
*Assistant Examiner* — Martin Chang
(74) *Attorney, Agent, or Firm* — Staas & Halsey LLP

(57) ABSTRACT

A portable information processing device includes: a sensor configured to detect physical amount which changes according to a location within predetermined space; a first storage unit configured to store an association between the information of the physical amount and location information; a first processor configured to execute an application program; a second storage unit of which the storage capacity is smaller than that of the first storage unit, configured to store a part of the associations; and a second processor, which is connected to the sensor, configured to acquire the current location from the information of the physical amount detected by the sensor, and the associations stored in the second storage unit; wherein the first processor extracts a part of the associations from the associations stored in the first storage unit according to change in the current location due to movement of the portable information processing device.

6 Claims, 11 Drawing Sheets

FIG. 6

| LOCATION ID | BOUNDARY FLAG | APPLICATION NOTIFICATION FLAG |
|---|---|---|
| 1-D | 0 | 0 |
| 1-B | 0 | 0 |
| 1-A | 0 | 1 |
| 1-J | 1 | 0 |
| 1-E | 1 | 0 |
| 2-A | 1 | 0 |

FIG. 9

| REGISTRATION ID | LOCATION ID | BOUNDARY FLAG |
|---|---|---|
| 1 | 1-D | 0 |
| 2 | 1-B | 0 |
| 3 | 1-J | 1 |
| 4 | 1-A | 0 |
| 5 | 1-E | 1 |
| 6 | 2-A | 1 |

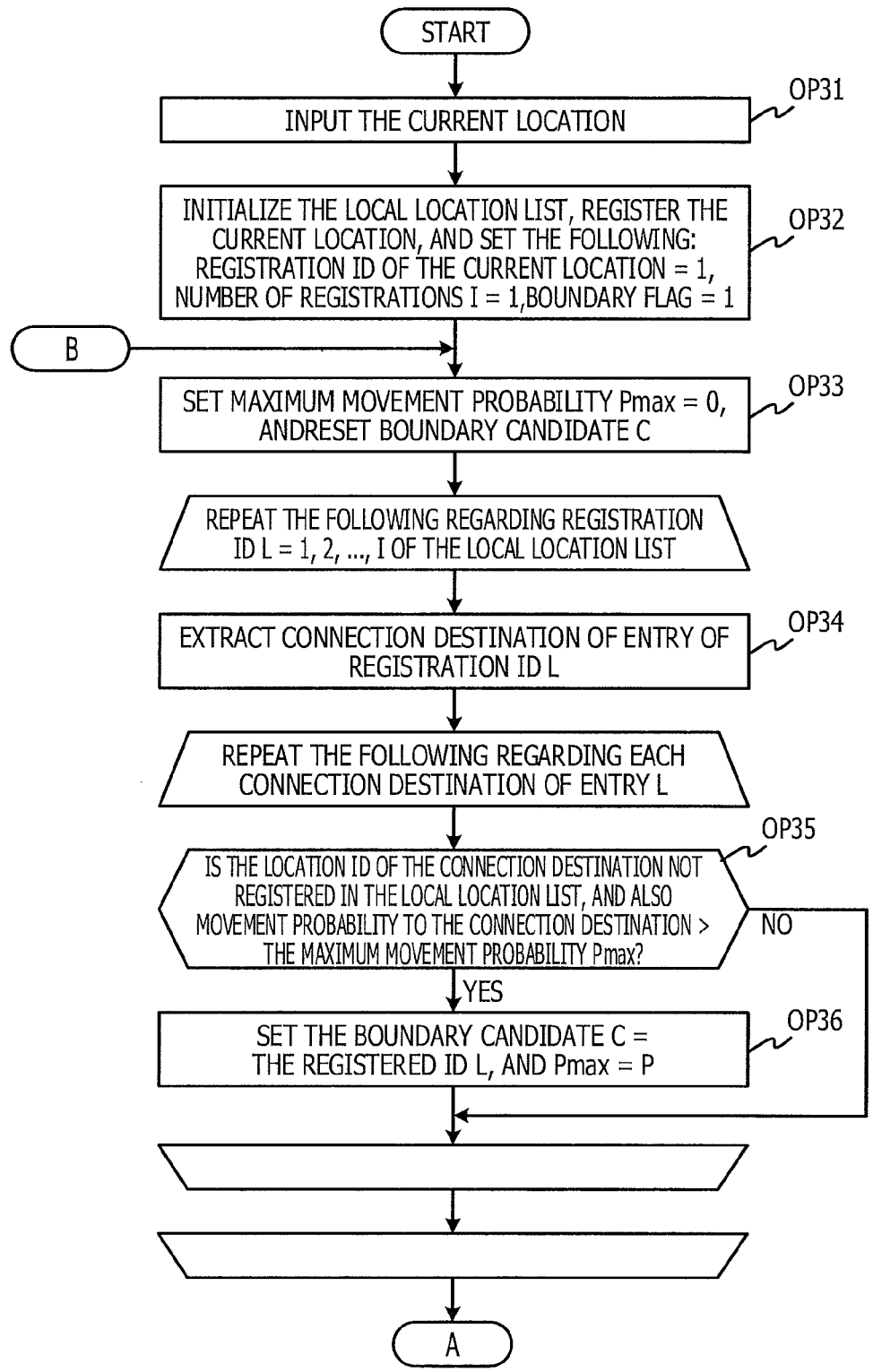

PORTABLE INFORMATION PROCESSING DEVICE AND INFORMATION PROCESSING METHOD

CROSS-REFERENCE TO RELATED APPLICATION

This application is based upon and claims the benefit of priority of the prior Japanese Patent Application No. 2013-176998, filed on Aug. 28, 2013, the entire contents of which are incorporated herein by reference.

FIELD

The embodiment discussed herein is related to, for example, a portable-type information processing device, an information processing method, and an information processing program, configured to detect current location.

BACKGROUND

There is a service for providing information according to the current location of a portable terminal such as a smartphone, cellular phone terminal, tablet terminal, or the like. As an example of such a service, there is a service in which when a user enters a shop, a coupon is provided to the user's portable terminal. Such a service employs a location detection function according to a portable terminal. Examples to be used for location detection of a portable terminal include Wireless Fidelity (WiFi), and Bluetooth (registered trademark). Such location detection is disclosed in, for example, Japanese Laid-open Patent Publication No. 2009-159336, International Publication Pamphlet No. WO 2004/034725, and Japanese Laid-open Patent Publication No. 2012-8659.

SUMMARY

In accordance with an aspect of the embodiments, a portable information processing device includes: a sensor configured to detect physical amount which changes according to a location within predetermined space; a first storage unit configured to store an association between the information of the physical amount and location information; a first processor configured to execute an application program; a second storage unit of which the storage capacity is smaller than that of the first storage unit, configured to store a part of the associations; and a second processor, which is connected to the sensor, configured to acquire the current location from the information of the physical amount detected by the sensor, and the associations stored in the second storage unit; wherein the first processor extracts a part of the associations from the associations stored in the first storage unit according to change in the current location due to movement of the portable-type information processing device, and after transmitting the extracted part of the associations to the second processor, goes into a power-saving state; and wherein the second processor updates information stored in the second storage unit using the part of the associations received from the first processor.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which:

FIG. 6 is a diagram illustrating an example of information held at a local location information database;

FIG. 9 is a diagram illustrating an example of a local location list;

FIG. 10A is an example of a flowchart of local location extraction processing.

DESCRIPTION OF EMBODIMENTS

Hereinafter, embodiments of the present technology will be described based on the drawings. The configurations of the following embodiments are an example, and the present technology is not restricted to the configurations of the embodiments.

Figure 1:
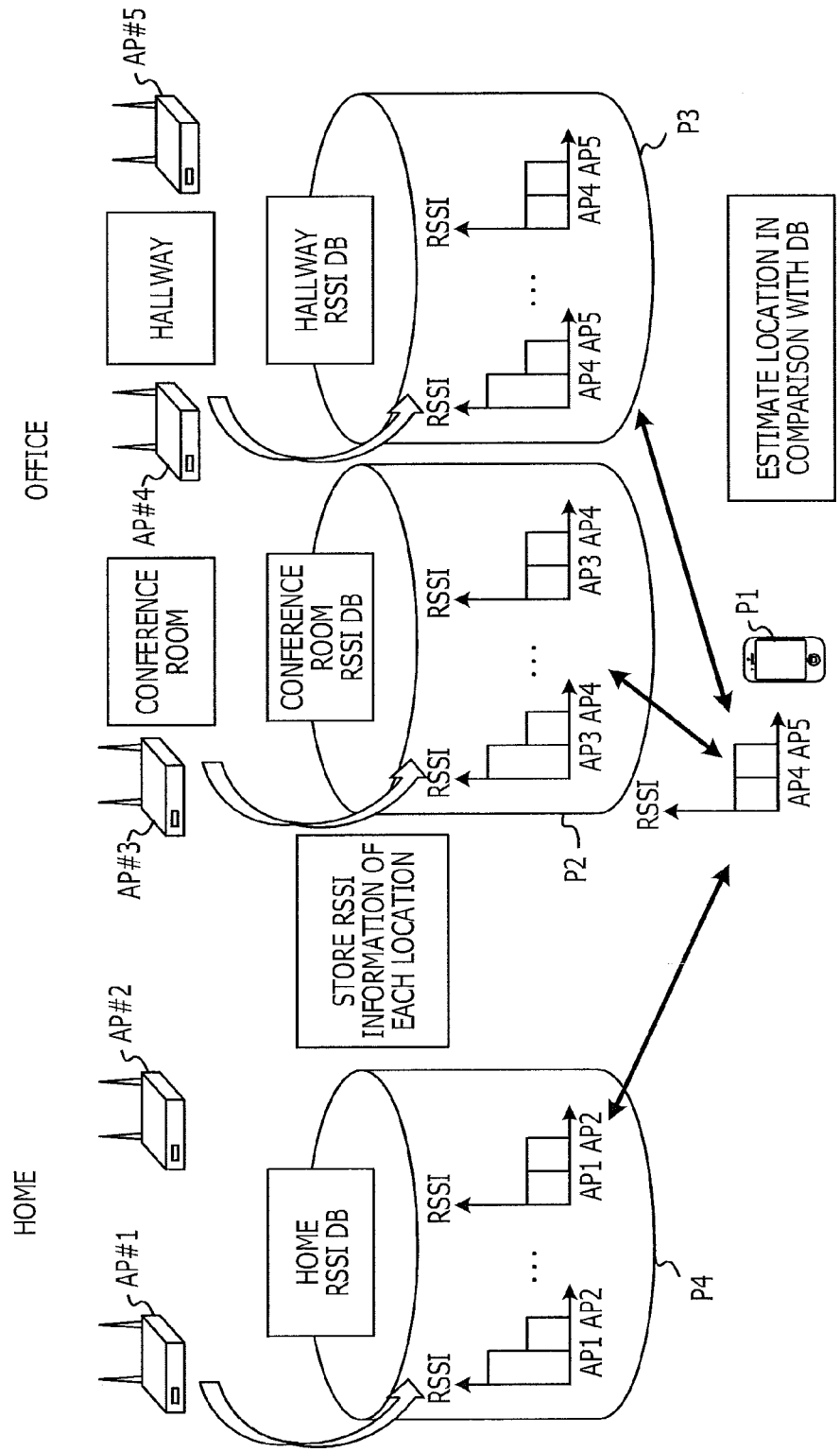
FIG. 1 is a diagram illustrating an example of location detection with WiFi.

FIG. 1 is a diagram illustrating an example of location detection with WiFi. The radio field strength of radio waves changes according to distance between a portable terminal P1 and an access point (AP). Therefore, the radio field strength of radio waves received from each AP is obtained at the portable terminal P1, whereby the current location of the portable terminal P1 may be detected. Note that "location" in the present Specification means space with a predetermined size, for example, such as a room, store, hallway, or the like.

A database for received signal strength indication (RSSI) information is prepared beforehand regarding the locations in location detection with WiFi. The RSSI information includes, obtained from a beacon signal which an AP transmits, the media access control (MAC) address and service set identifier (SSID) of this AP, and the received signal strength of this beacon signal, and so forth.

For example, in the case of the example illustrated in FIG. 1, multiple radio wave patterns of the received radio waves from an AP #3 and an AP #4 measured at multiple points within a conference room are held at a conference room RSSI database (DB) P2. Multiple radio wave patterns of the received radio waves from an AP #4 and an AP #5 measured at multiple points in a hallway are held at a hallway RSSI DB P3. Multiple radio wave patterns of the received radio waves from an AP #1 and an AP #2 measured at multiple points within the home are held at a home RSSI DB P4.

The portable terminal P1 includes these RSSI DBs P2, P3, and P4. The portable terminal P1 scans an AP, acquires AP information including the MAC address, SSID, radio wave strength, and so forth from the received beacon signal, collates this AP information with the RSSI information held in each DB, and determines the current location. In the case of the example in FIG. 1, the portable terminal P1 receives radio waves from the AP #4 and AP #5. Since the received radio field strength patterns are included in a range of predetermined tolerance as to the radio wave pattern held at the hallway RSSI DB P3, the current location of the portable terminal P1 is detected to be the hallway.

A sensor (position detection sensor) used for location detection processing of a wireless device, such as WiFi or the like, microphone, magnetic sensor, Global Positioning System (GPS) receiver, or the like, is often controlled by a central processing unit (CPU) configured to execute an application at the portable terminal. The CPU configured to execute an application is referred to as a main CPU, application CPU, or the like. Hereinafter, the CPU configured to execute an application will be referred to as an application CPU in the present Specification. Power consumption due to the application CPU is great at the location detection processing of the portable terminal. Therefore, the portable terminal according to the first embodiment includes a power-saving microprocessor in addition to the application CPU, and causes this microprocessor to perform the location detection processing.

The application CPU is designed to realize high processing performance. The application CPU uses a fine process with great leak current, and also utilizes external memory. As a result thereof, the application CPU consumes a great amount of power even when processing small computation amounts or even in an idle state. On the other hand, the power-saving microprocessor is designed so as to maximize energy efficiency. The power-saving microprocessor employs a process with little leak current, and operates using built-in memory. As a result thereof, the power consumption of the power-saving microprocessor is smaller than that of the application CPU when processing with small computation amounts or in an idle state. Since sensing processing with relatively small computation amount is intermittently executed during execution of a service with location detection, the power consumption of the portable terminal may be reduced by the power-saving microprocessor executing this sensing processing. The term "sensing processing" means processing to perform scan control using the position detection sensor, and to perform location detection from the scan result.

However, the capacity of random access memory (RAM) built into the microprocessor is small, in the order of tens of kilobytes (KB) for example. In the case of the location detection processing, the portable terminal includes a database for RSSI information, for example, in the case of WiFi. For example, memory capacity of 18 KB is consumed in location detection in the case of two floors of an office, 24 locations, and 43 applications so as to hold RSSI information. Accordingly, since it is difficult for the microprocessor to hold information of all floors of this office, the microprocessor holds information within a local area including the current location in the first embodiment.

That is to say, the portable terminal includes the application CPU and microprocessor, and the microprocessor executes the location detection processing in the first embodiment. The application CPU determines the information within a local region used for location detection held at the microprocessor, and goes into a suspended state after passing this information to the microprocessor. The suspended state is also referred to as the power-saving state of the application CPU, and means a state in which the application CPU stops the clock or the like so as not to perform processing, or a state in which part of power supply voltage is lowered. Hereinafter, the first embodiment will be described assuming that the location detection processing is performed with WiFi.

Figure 2:
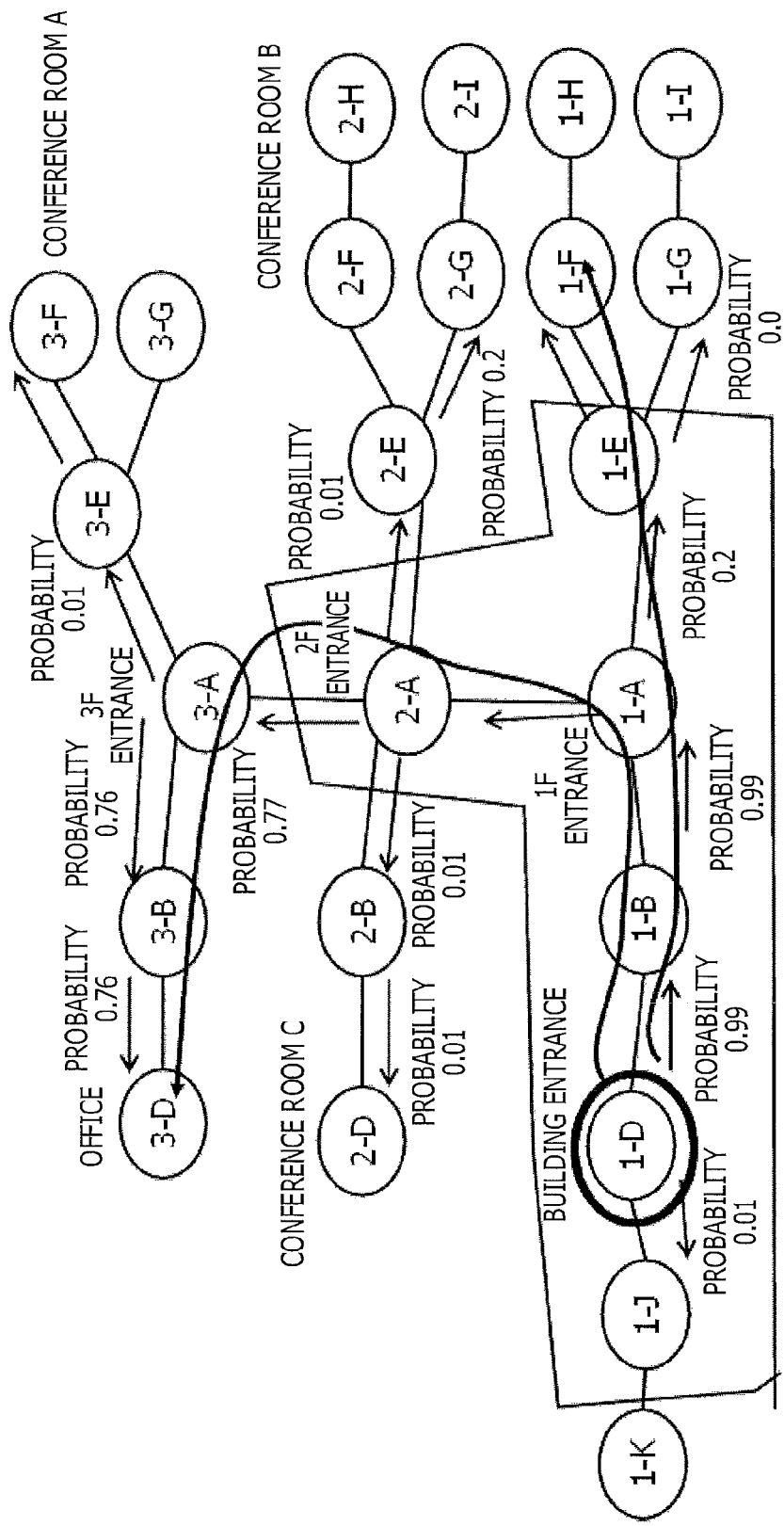
FIG. 2 is a diagram illustrating local location extraction processing according to a first embodiment.

FIG. 2 is a diagram illustrating an example of local location extraction processing according to the first embodiment. FIG. 2 illustrates a schematic map of locations registered within a certain building. In FIG. 2, the locations are illustrated with a location ID, and the locations are connected with a connector. Locations connected by a connector indicate that movement of the portable terminal may occur therebetween.

The local location extraction processing is processing to extract a location within a predetermined range according to the current location of the portable terminal for determining RSSI information to be stored in the storage area of the microprocessor. Hereinafter, the location within a predetermined range according to the current location of the portable terminal will be referred to as "local location".

The local location extraction processing is specifically performed as follows.

(1) A local location list is initialized, and the current location is registered in the list.

(2) Of locations registered in the local location list, a location with the maximum movement probability is determined out of the location of a boundary portion. The term "location of a boundary portion" means a location with a connector to a location not registered in the local location list. It is to be understood that "movement" as used in the present Specification relates to movement of a portable terminal between locations, even if not specifically stated. Accordingly, the term "location with the maximum movement probability" means a location regarding which the portable terminal is most likely to move.

(3) A location adjacent to the location determined in (2) and also not registered in the local location list is extracted. In the case that the number of registrations in the local location list does not exceed the maximum registration number N (positive number) even when registering the extracted location, the extracted location is registered in the local location list. In the case that the number of registrations in the local location list exceeds the N when registering the extracted location, the extracted location is not registered in the local location list, and the processing is ended.

In the case that the current location is a location 1-D, and the maximum registration number N of the local location list N=8 in the example illustrated in FIG. 2, the local location is determined as follows.

(1) The local location list is initialized, and the location 1-D of the current location is registered in the list.

(2-1) Since other than the location 1-D is not registered in the local location list, the boundary portion and also the location with the maximum movement efficiency is the location 1-D.

(3-1) The connection destination of the current location 1-D, and also locations 1-B and 1-J not registered in the local location list are registered in the local location list. The number of the current registrations is 3<N (8).

(2-2) The locations 1-B and 1-J are extracted as the locations of the boundary portion. Since the movement probability to the location 1-B is 0.99, and the movement probability to the location 1-J is 0.01, the location 1-B with the maximum movement probability is extracted.

(3-2) The connection destination of the location 1-B and also an unregistered location 1-A are registered in the local location list. At this time, the number of registrations is 4<N (that is, 8).

(2-3) The locations 1-A and 1-J are extracted as the locations of the boundary portion. Since the movement probability to the location 1-A is 0.99, and the movement probability to the location 1-J is 0.01, the location 1-A with the maximum movement probability is extracted.

(3-3) The connection destination of the location 1-A and also unregistered locations 1-E and 2-A are registered in the local location list. At this time, the number of registrations is 6<N (that is, 8).

(2-4) The locations 2-A, 1-E, and 1-J are extracted as the locations of the boundary portion. Since the movement probability to the location 2-A is 0.79, the movement probability to the location 1-E is 0.2, and the movement probability to the location 1-J is 0.01, the location 2-A with the maximum movement probability is extracted.

(3-4) The connection destination of the location 2-A and also unregistered locations 2-B, 2-E, and 3-A are registered in the local location list. Since the number of registrations is 9<N (that is, 8), the locations 2-B, 2-E, and 3-A are not registered in the local location list, and the processing is ended.

Thus, the locations 1-A, 1-B, 1-D, 1-E, 1-J, and 2-A are extracted as the local locations by the application CPU in the example illustrated in FIG. 2. That is to say, a location on a route regarding which the probability that the portable terminal will pass is high, and connection destinations branched from this location on the route, are selected as the local locations in the first embodiment. In the case of the example illustrated in FIG. 2, the route regarding which the probability that the portable terminal will pass is high, is a route of the locations 1-D→1-B→1-A→2-A. Also, the connection destinations branched from the location on the route, regarding which the probability that the portable terminal will pass is high, are the locations 1-J and 1-E.

The RSSI information of a local location is passed from the application CPU to the microprocessor, and hereinafter, the application CPU proceeds to the suspended state in the first embodiment. Also, the above local location extraction processing is executed in the initial state, and in the case of the portable terminal moving to the boundary portion within a local location, in the first embodiment.

Figure 3:
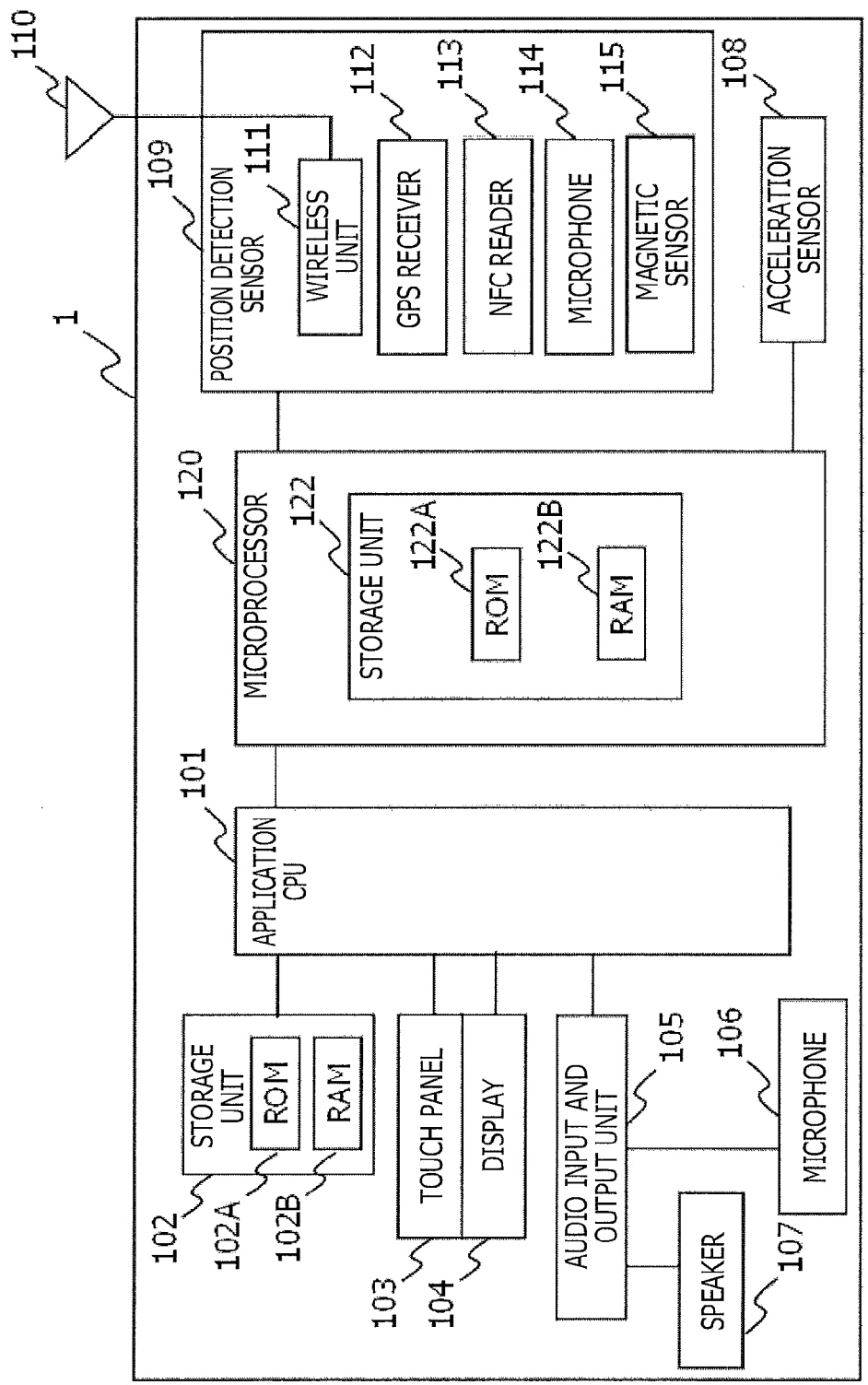
FIG. 3 is a diagram illustrating an example of a hardware configuration of a portable terminal according to the first embodiment.

FIG. 3 is a diagram illustrating a hardware configuration of a portable terminal 1 according to the first embodiment. Examples of the portable terminal 1 include a smartphone, a cellular phone terminal, a tablet terminal, a portable game machine, and a portable music player. The portable terminal 1 includes an application CPU 101, a storage unit 102, a touch panel 103, a display 104, an audio input and output unit 105, a microphone 106, a speaker 107, an acceleration sensor 108, and a position detection sensor 109.

The touch panel 103 is one of position input devices, which is disposed in the surface of the display 104, outputs the coordinates of a touch position of a user's finger to the application CPU 101. The touch panel 103 may be one of an electrostatic capacitance system, resistive film system, surface acoustic wave system, infrared system, electromagnetic induction system, and so forth.

Examples of the display 104 include a liquid crystal display (LCD). The display 104 displays screen data in accordance with the signal input from the application CPU 101.

The audio input and output unit 105 connects the microphone 106 serving as an audio input device, and the speaker 107 serving as an audio output device. The audio input and output unit 105 connects the application CPU 101, and converts the audio signals input from the microphone 106 into electric signals, and outputs to the application CPU 101, or converts the electric signals input from the application CPU 101 into audio signals, and outputs to the speaker 107. The audio input and output unit 105, microphone 106, and speaker 107 go into an off state when the application CPU 101 is in the suspended state.

The storage unit 102 includes read only memory (ROM) 102A and RAM 102B. The RAM 102B includes both of volatile RAM and nonvolatile RAM. The storage unit 102 may be accessed from the application CPU 101. Also, the storage unit 102 may be housed in the application CPU 101 or may be externally attached. In the case of being externally attached, access load to the storage unit 102 increases. In the case that the application CPU 101 is in the suspended state, at least the ROM 102A goes into the off state in the first embodiment. The storage unit 102 is an example of "first storage unit".

The application CPU 101 loads a program held at the ROM 102A to the RAM 102B, and executes loaded commands, thereby performing various types of processing. The application CPU 101 accepts input from one of the touch panel 103, audio input and output unit 105, and microprocessor 120, executes predetermined processing, and outputs processing results to one of the storage unit 102, display 104, audio input and output unit 105, and microprocessor 120. The application CPU 101 is an example of "first processor".

The ROM 102A stores, for example, an operating system (OS), a local location extraction program, and other application programs. The local location extraction program is a program for the application CPU 101 extracting a local location, and passing the RSSI information of this local location to the microprocessor 120. Note that the local location extraction program may be stored in the nonvolatile RAM 102B.

The microprocessor 120 loads, for example, a program held at ROM 122A to RAM 122B, and executes a loaded command. The microprocessor 120 keeps an on state in the case that the application CPU 101 is in the suspended state. The microprocessor 120 is an example of "second processor".

The microprocessor 120 houses a storage unit 122. The storage unit 122 includes ROM 122A and RAM 122B. The RAM 122B includes both of volatile RAM and nonvolatile RAM. The RAM 122B has less storage capacity than that of the RAM 102B which the application CPU 101 uses. The storage unit 122 is an example of "second storage unit".

The ROM 122A holds an OS, a location detection program, and so forth. The microprocessor 120 loads the program held at the ROM 122A to the RAM 122B, and executes a loaded command. The location detection program is a program for the microprocessor 120 performing the location detection processing. The location detection program may be held at the nonvolatile RAM 122B.

The microprocessor 120 connects to the position detection sensor 109. The position detection sensor 109 is a sensor configured to detect physical amount which changes according to electromagnetic waves or acoustic waves used for the location detection processing or a position within predetermined space such as a magnetic field or the like. The position detection sensor 109 includes, for example, a wireless unit 111, a GPS receiver 112, a near field communication (NFC) reader 113, a microphone 114, and a magnetic sensor 115.

The wireless unit 111, which connects to an antenna 110, configured to convert the wireless signals (electromagnetic waves) received through the antenna 110 into electric signals to output to the microprocessor 120, or to convert the electric signals input from the microprocessor 120 into wireless signals to transmit through the antenna 110. The wireless unit 111 includes a processor configured to perform processing relating to wireless communication and memory, and handles any one or more of the third generation mobile communication system, second generation mobile communication system, Long Term Evolution (LTE), WiFi, WiMAX, and Bluetooth (registered trademark), for example. It is assumed in the first embodiment that the wireless unit 111 is a wireless unit configured to handle WiFi.

The GPS receiver 112 is configured to receive GPS signals (electromagnetic waves) from a GPS satellite to acquire absolute coordinates (latitude and longitude). The current location of the portable terminal 1 may be pinpointed using the absolute coordinates and a map database (not illustrated). The NFC reader 113 configured to receive the radio waves transmitted from an NFC writer and to acquire identification information of the NFC writer which is a transmission source from the radio waves. The current location of the portable terminal 1 may be pinpointed using a database (not illustrated) which holds the acquired identification information of the NFC writer, and an association between the identification information of each NFC writer and installed location information.

The microphone 114 is configured to receive acoustic waves with a predetermined frequency from a transmitter. The current location of the portable terminal 1 may be pinpointed using a database (not illustrated) which holds the frequency of received acoustic waves, and an association between the frequency that the transmitter uses, and the installed location information of each transmitter.

The magnetic sensor 115 measures, for example, magnetic field strength and magnetic flux density. For example, the current location of the portable terminal 1 may be pinpointed using a map database (not illustrated) which holds the magnetic field strength and magnetic flux density, and an association between coordinates, and magnetic field strength or magnetic flux density.

Note that the hardware configuration of the portable terminal 1 is not restricted to that illustrated in FIG. 3, and a modification such as addition, replacement, deletion, or the like may be made as appropriate. For example, the portable terminal 1 may include, in addition to the configuration illustrated in FIG. 3, a camera, an infrared communication unit, and so forth. The portable terminal 1 is an example of "information processing device" according to an embodiment.

Figure 4:
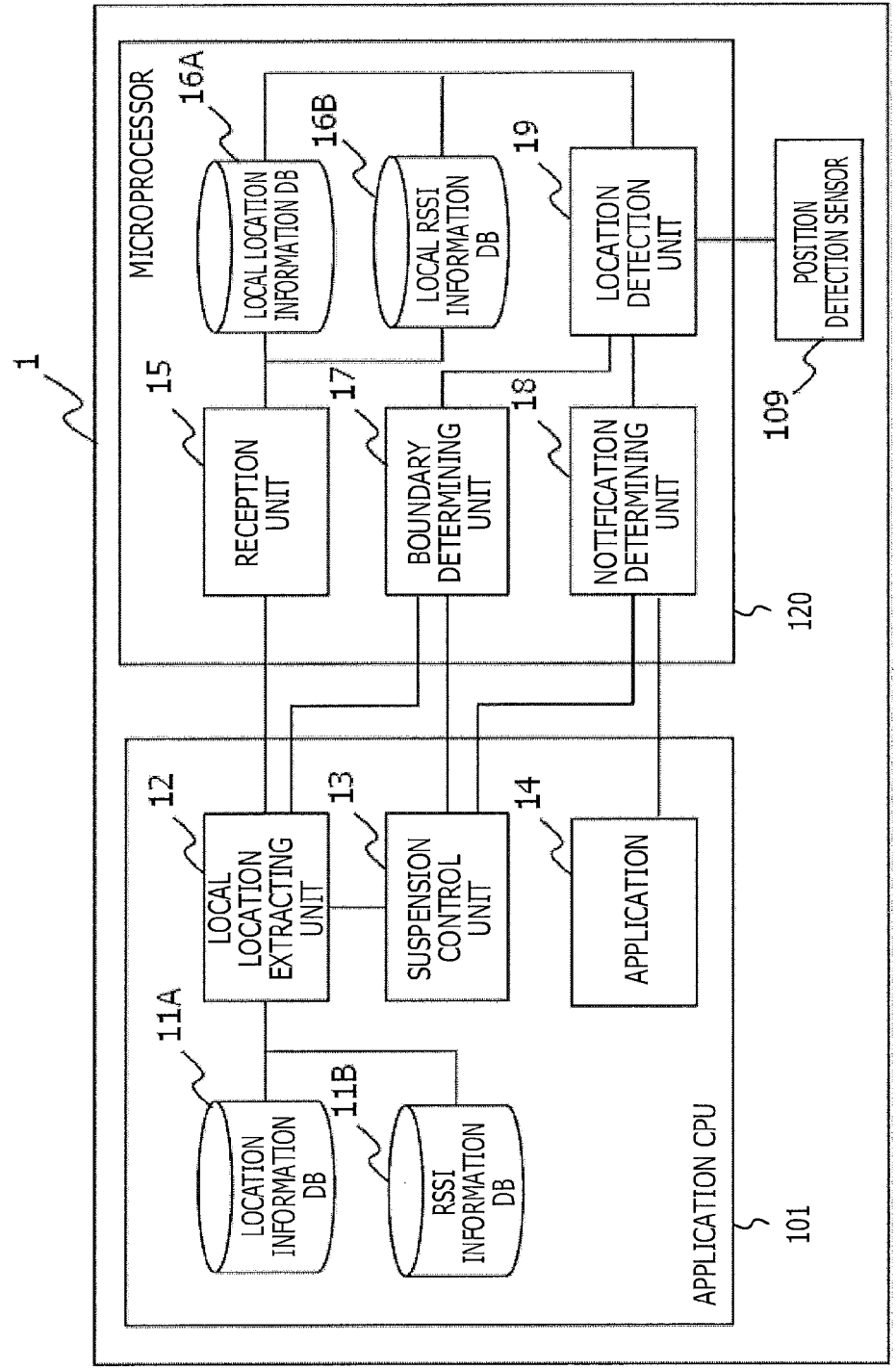
FIG. 4 is a diagram illustrating an example of a function configuration of the portable terminal according to the first embodiment.

FIG. 4 is a diagram illustrating an example of a function configuration of the portable terminal 1 according to the first embodiment. The portable terminal 1 includes, as the function configuration, a location database 11A, an RSSI information database 11B, a local location extraction unit 12, a suspension control unit 13, an application 14, a reception unit 15, an local location information database 16A, a local RSSI information database 16B, a boundary determining unit 17, a notification determining unit 18, a location detection unit 19, and a position detection sensor 109. The position detection sensor 109 is the wireless unit 111 of WiFi in the first embodiment.

The local location extraction unit 12 and suspension control unit 13 are functions that are achieved by the application CPU 101 executing a local location extraction program held at the storage unit 102. The location information database 11A and RSSI information database 11B are databases which are generated in a storage area of the RAM 102B and used by the application CPU 101 configured to execute the local location extraction program. The application 14 is processing to be performed by the application CPU 101 executing an application program held at the storage unit 102. The application is an application employing the results of the location detection processing in the first embodiment.

The location information database 11A holds, for example, regarding each location, the location of a connection destination, and the movement probability to this connection destination in increments of buildings, municipalities, or states. Details of the location information database 11A will be described later. The RSSI information database 11B holds, for example, a database for RSSI regarding each location in increments of buildings, municipalities, or states (see FIG. 1).

The local location extraction unit 12 executes the local location extraction processing, that is, extracts a local location using the location information database 11A based on the current location of the portable terminal 1. The local location extraction unit 12 executes the local location extraction processing, for example, in the case that, in the initial state of the portable terminal 1, an updating request has been received from a later-described boundary determining unit 17. The current location of the portable terminal 1 may be acquired using one component in the position detection sensor 109, or may be input by the user of the portable terminal 1. The local location extraction unit 12 acquires RSSI information corresponding to the extracted local location from the RSSI information database 11B, and outputs this to the reception unit 15 along with information regarding the extracted local location. Also, upon having completed the local location extraction processing, the local location extraction unit 12 informs a suspension request to the suspension control unit 13. Details of the processing of the local location extraction unit 12 will be described later.

Upon having received the suspension request from the local location extraction unit 12, the suspension control unit 13 causes the application CPU 101 to go into the suspended state. Also, upon having received an activation request from the boundary determining unit 17 or notification determining unit 18 in the suspended state of the application CPU 101, the suspension control unit 13 causes the application CPU 101 to return (activate) from the suspended state.

The reception unit 15, boundary determining unit 17, notification determining unit 18, and location detection unit 19 are processes to be performed by the microprocessor 120 executing the location detection program held at the storage unit 122. The local location information database 16A and local RSSI information database 16B are databases which are generated in the storage area of the RAM 122B, and used by the microprocessor 120 configured to execute the location detection program.

The reception unit 15 receives RSSI information corresponding to a local location, and information regarding the local location from the local location extraction unit 12. The reception unit 15 updates the local RSSI information database 16B using the RSSI information corresponding to the received local location. The reception unit 15 updates the local location information database 16A using the information regarding the received local location.

The location detection unit 19 detects the current location of the portable terminal 1 using the RSSI information input from the position detection sensor 109 (the wireless unit 111 of WiFi in the first embodiment) and the local RSSI information database 16B, at a predetermined cycle, while the portable terminal 1 is moving. The location detection unit 19 informs the detected current location to the boundary determining unit 17 and notification determining unit 18.

Whether or not the portable terminal 1 is moving is determined, for example, by an acceleration detection result from the acceleration sensor 108 to the microprocessor 120. Also, a predetermined cycle at which the location detection processing is executed by the location detection unit 19 is, for example, five to several tens seconds. When this cycle is short, the number of times of execution of the location detection processing increases, and power consumption increases, and accordingly, this cycle is set by the administrator according to the performance of the microprocessor 120 and a permissible range of detection notification delay as appropriate.

The boundary determining unit 17 determines whether or not the current location of the portable terminal 1 that the location detection unit 19 informs is a boundary portion. The term "boundary portion" means a location where the RSSI information of the location of a connection destination is not included in the local RSSI information database 16B. The determination regarding whether or not the current location is the boundary portion is performed based on information held at the local location information database 16A which will be described later. In the case that the current location is the boundary portion, in order to update the local location information database 16A and local RSSI information database 16B, the boundary determining unit 17 transmits an activation request to the suspension control unit 13 and transmits an updating request to the local location extraction unit 12. Details of the processing of the boundary determining unit 17 will be described later.

The notification determining unit 18 determines whether or not the current location of the portable terminal 1 that the location detection unit 19 informs is a location where a notification to the application 14 is set. Information of the location where a notification to the application 14 is set is included in information regarding the local location and held at the local location information database 16A, for example. In the case that the current location of the portable terminal 1 is the location where a notification to the application 14 is set, the notification determining unit 18 informs the detected current location of the portable terminal 1 to the application 14.

Figure 5:
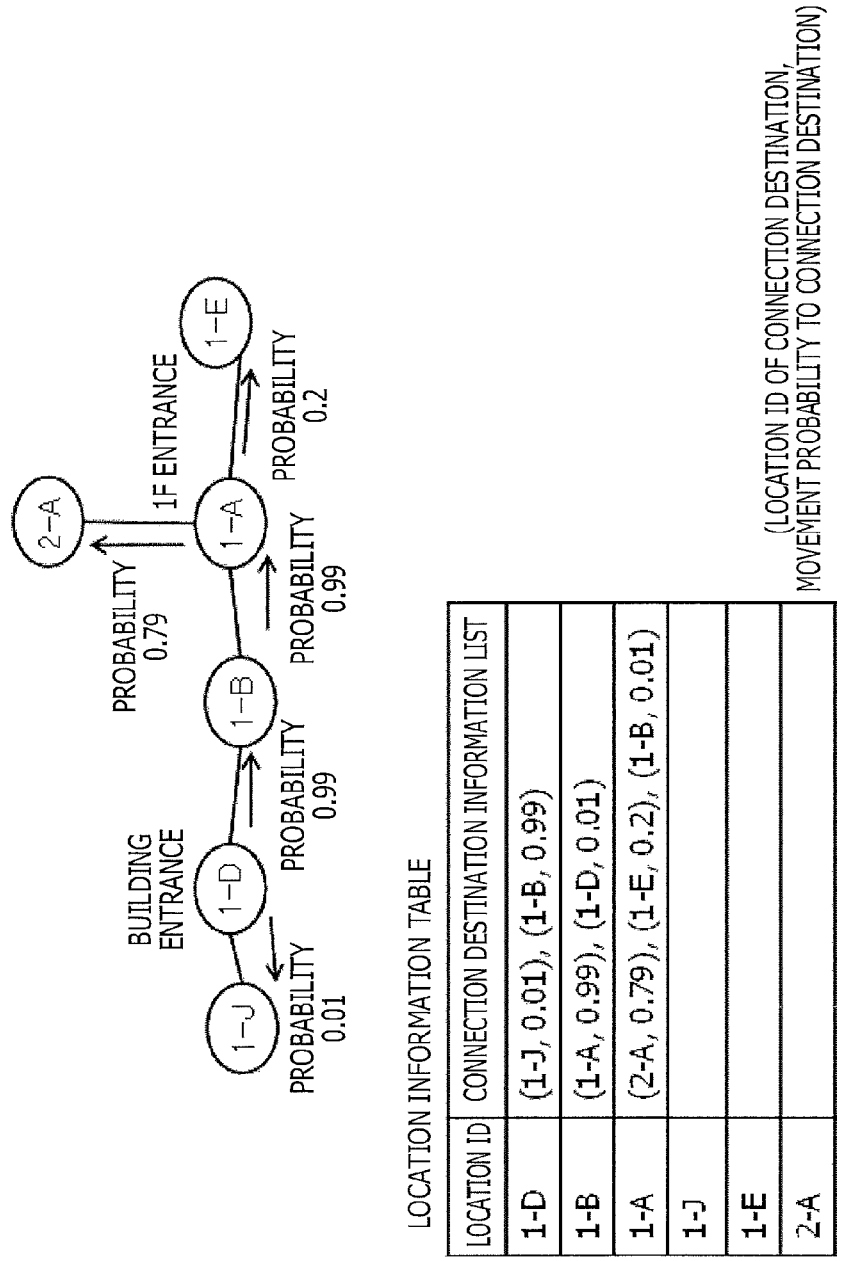
FIG. 5 is a diagram illustrating an example of information held at a location information database.

FIG. 5 is a diagram illustrating an example of information held at the location information database 11A. The location information database 11A holds a transition diagram that is created with a location as a node and with movement between locations as a connector based on history information, for example. In practice, a location information table such as illustrated in FIG. 5 is held as the data of a transition diagram instead of a transition diagram.

The location information table holds, for example, an association between the ID of each location included in a predetermined range and a connection destination information list in increments of buildings, municipalities, or states. The connection information list includes the location ID of the connection destination of the connector of each location, and the movement probability to this connection destination. The connection destination information is defined as (the location ID of the connection destination, the movement probability to the connection destination) in the example illustrated in FIG. 5.

The information held at the location information database 11A is created by an external server configured to hold the movement history of a portable terminal which has subscribed to a predetermined service, and provided to the portable terminal 1. Note that the information held at the location information database 11A is not restricted to the example illustrated in FIG. 5, and may be modified depending on services or system specifications as appropriate.

FIG. 6 is a diagram illustrating an example of information held at the local location information database 16A. The information held at the local location information database 16A is information regarding a local location that the local location extraction unit 12 passes to the reception unit 15.

The local location information database 16A holds the location ID of a local location, a boundary flag, and an application notification flag. The boundary flag is a flag indicating whether or not the corresponding location is the boundary portion. For example, in the case that the boundary flag is "1", this indicates that the corresponding location is the location of the boundary portion. The application notification flag is a flag indicating whether or not the corresponding location is a location where a notification to the application 14 is set. In the case that the application notification flag is "1", this indicates that the corresponding location is a location where a notification to the application 14 is set.

Note that the information held at the local location information database 16A is not restricted to the example indicated in FIG. 6. For example, the information held at the local location information database 16A may include no information regarding a local location which is not the boundary location. In this case, since it is indicated that a location not included in the local location information database 16A is not the boundary portion, the boundary flag may include no information regarding the local location.

Figure 7:
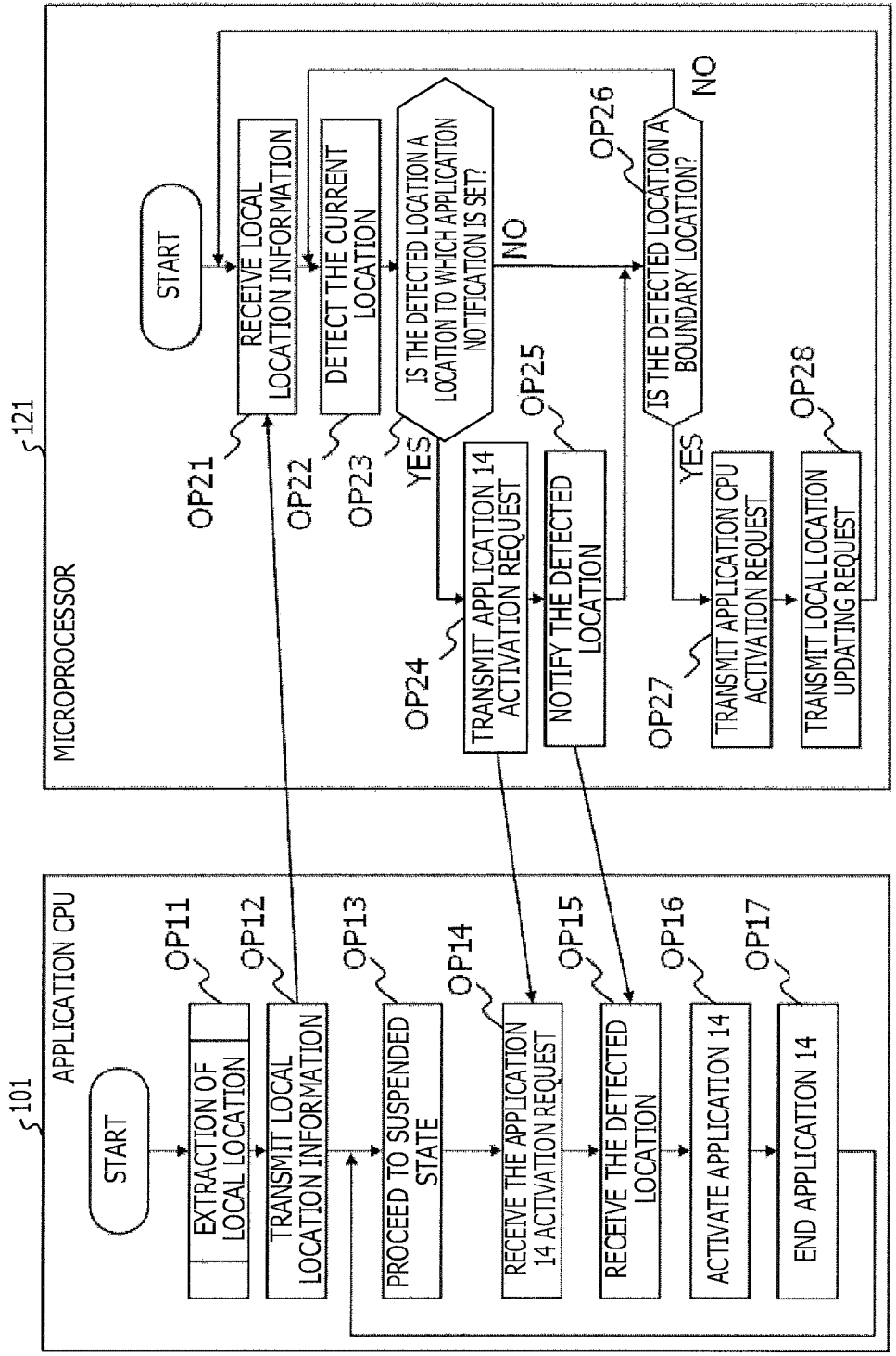
FIG. 7 is a diagram illustrating an example of a processing sequence between an application CPU and a microprocessor, according to the first embodiment.
Figure 8:
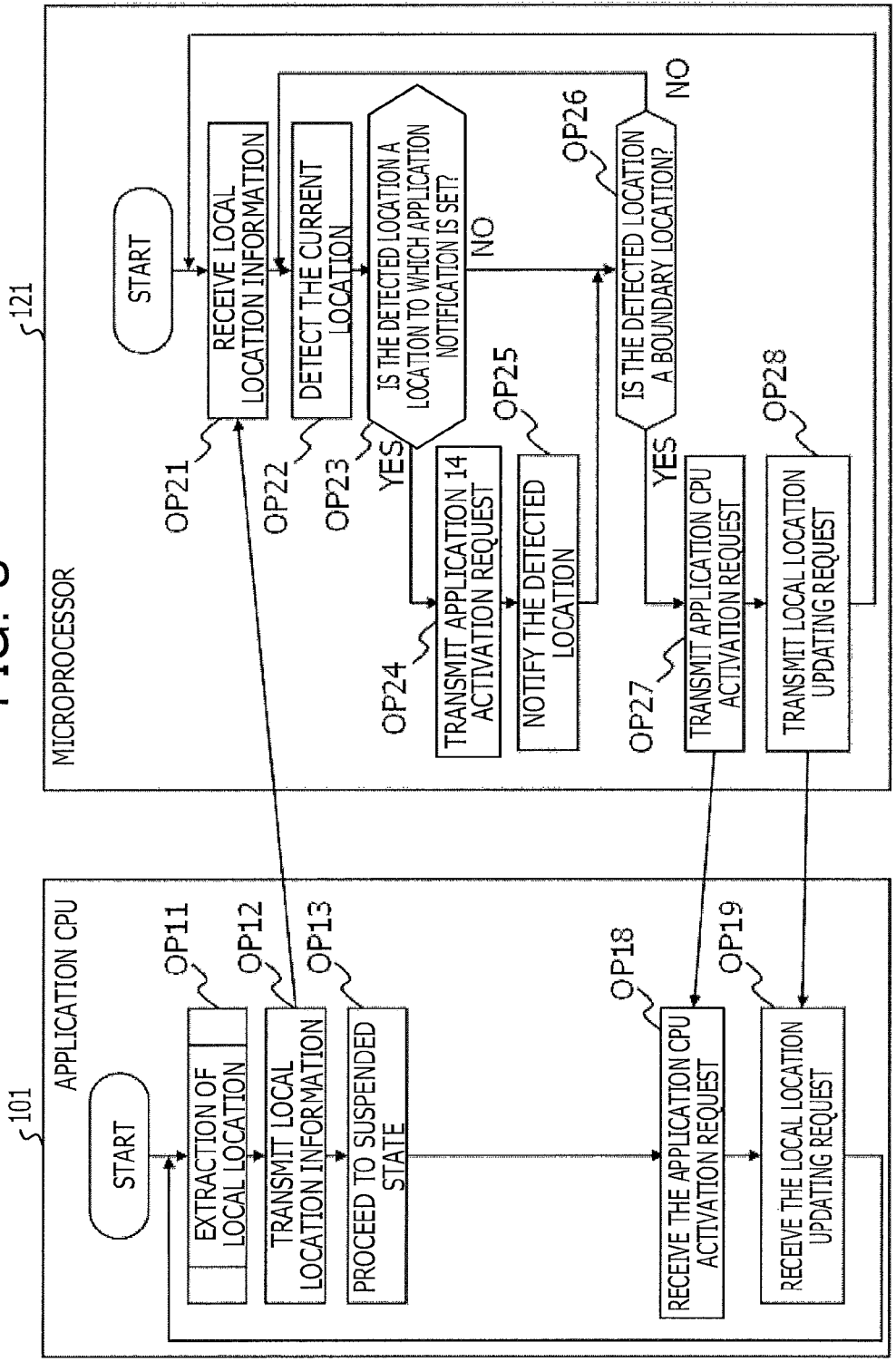
FIG. 8 is a diagram illustrating an example of a processing sequence between an application CPU and a microprocessor, according to the first embodiment.

FIGS. 7 and 8 are diagrams illustrating an example of a processing sequence between the application CPU 101 and microprocessor 120 according to the first embodiment. The processing of the application CPU 101 and microprocessor 120 illustrated in FIGS. 7 and 8 is started when the power is supplied to the portable terminal 1, for example. The same processing is described in both of FIGS. 7 and 8 regarding the microprocessor 120. FIG. 7 illustrates a sequence in the case that the portable terminal 1 has moved to a location where a notification to the application 14 is set. FIG. 8 illustrates a sequence in the case that the portable terminal 1 has moved to the location of the boundary portion. Redundant description will be omitted in FIGS. 7 and 8.

In OP11, the application CPU 101 executes the local location extraction processing to extract a local location. Details of the local location extraction processing executed in OP 11 will be described later. Next, the processing proceeds to OP12.

In OP12, the application CPU 101 extracts RSSI information corresponding to the local location extracted by the local location extraction processing from the RSSI information database 11B, generates information regarding the local location (see FIG. 6), and transmits this to the microprocessor 120. Hereinafter, the RSSI information corresponding to a local location, and the information regarding a local location will collectively be referred to as local location information. In OP13, the application CPU 101 goes into the suspended state.

The local location information transmitted by the application CPU 101 in OP12 is received by the microprocessor 120 in OP21. The microprocessor 120 updates the local location information database 16A and local RSSI information database 16B using the received local location information. Next, the processing of the microprocessor 120 proceeds to OP22.

In OP22, the microprocessor 120 executes the location detection processing using the updated local RSSI information database 16B along with movement of the portable terminal 1 to detect the current location. Next, the processing proceeds to OP23.

In OP23, the microprocessor 120 determines whether or not the detected current location is a location where a notification to the application 14 is set. This determination is performed, for example, based on the information stored in the local location information database 16A (see FIG. 6). In the case that the current location of the portable terminal 1 is a location where a notification to the application 14 is set (Yes in OP23), the processing proceeds to OP24. In the case that the current location of the portable terminal 1 is not a location where a notification to the application 14 is set (No in OP23), the processing proceeds to OP26.

In OP24, since the current location of the portable terminal 1 is a location where a notification to the application 14 is set, the microprocessor 120 transmits an activation request to the application CPU 101. In OP25, the microprocessor 120 informs the detected current location to the application CPU 101.

In OP26, the microprocessor 120 determines whether or not the detected current location is the location of the boundary portion. This determination is performed, for example, based on the information held at the local location information database 16A (see FIG. 6). In the case that the current location of the portable terminal 1 is the location of the boundary portion (Yes in OP26), the processing proceeds to OP27. In the case that the current location of the portable terminal 1 is not the location of the boundary portion (No in OP26), the processing proceeds to OP22.

In OP27, since the current location of the portable terminal 1 is the boundary portion, the microprocessor 120 transmits an activation request to the application CPU 101. Also, in OP28, the microprocessor 120 transmits an updating request for the local location information to the application CPU 101. Thereafter, the processing is repeatedly executed from OP21.

The processing mentioned above is processing common to FIGS. 7 and 8. Hereinafter, the processing of the application CPU 101 differs for FIGS. 7 and 8, so description will be made regarding each.

First, description will be made regarding the processing of the application CPU 101 in the case that the current location of the portable terminal 1 is a location where a notification to the application 14 is set illustrated in FIG. 7 (Yes in OP23).

In OP14, the application CPU 101 receives the activation request from the microprocessor 120. In OP15, the application CPU 101 receives the current location of the portable terminal 1 transmitted from the microprocessor 120.

In OP16, the application CPU 101 activates the corresponding application 14. The application 14 performs predetermined processing using the current location of the portable terminal 1 informed from the microprocessor 120. In OP17, the processing of the application 14 is ended. Thereafter, the processing proceeds to OP13, where the application CPU 101 goes into the suspended state again.

Next, description will be made regarding the processing of the application CPU 101 in the case that the current location of the portable terminal 1 is the location of the boundary portion illustrated in FIG. 8 (Yes in OP26).

In OP18, the application CPU 101 receives the activation request from the microprocessor 120. In OP19, the application CPU 101 receives the updating request for the local location information transmitted from the microprocessor 120. Thereafter, the processing proceeds to OP11, where the local location extraction processing is executed.

OP11, OP12, and OP19 in the processing of the application CPU 101 are equivalent to the processing of the local location extraction unit 12. OP13, OP14, and OP18 are equivalent to the processing of the suspension control unit 13. OP15, OP16, and OP17 are equivalent to the processing of the application 14.

OP21 in the processing of the microprocessor 120 is equivalent to the processing of the reception unit 15. The processing in OP22 is equivalent to the processing of the location detection unit 19. The processing in OP23 to OP25 is equivalent to the processing of the notification determining unit 18. The processing in OP26 to OP28 is equivalent to the processing of the boundary determining unit 17.

Note that the processing illustrated in FIGS. 7 and 8 is an example, and is not restricted to this, the sequence of the processing may be changed as appropriate. For example, of the processing of the microprocessor 120, the processing in OP23 to OP25 may be switched with the processing in OP26 to OP28.

FIG. 9 is a diagram illustrating an example of the local location list. The local location list is a list that the application CPU 101 employs in the local location extraction processing, and is a list of locations extracted as local locations. The local location list is created in memory housed in the application CPU 101, or in the RAM 102B of the storage unit 102, for example.

The entries in the local location list include a registration ID, location ID, and boundary flag. The registration ID is identification information for identifying the entries in the local location list. The location ID in the local location list is the location ID of a location to be extracted as a local location. The boundary flag is a flag indicating that the corresponding location is the boundary portion. In the case that the boundary flag is "1", this indicates that the corresponding location is the boundary portion in the first embodiment.

Figure 10B:
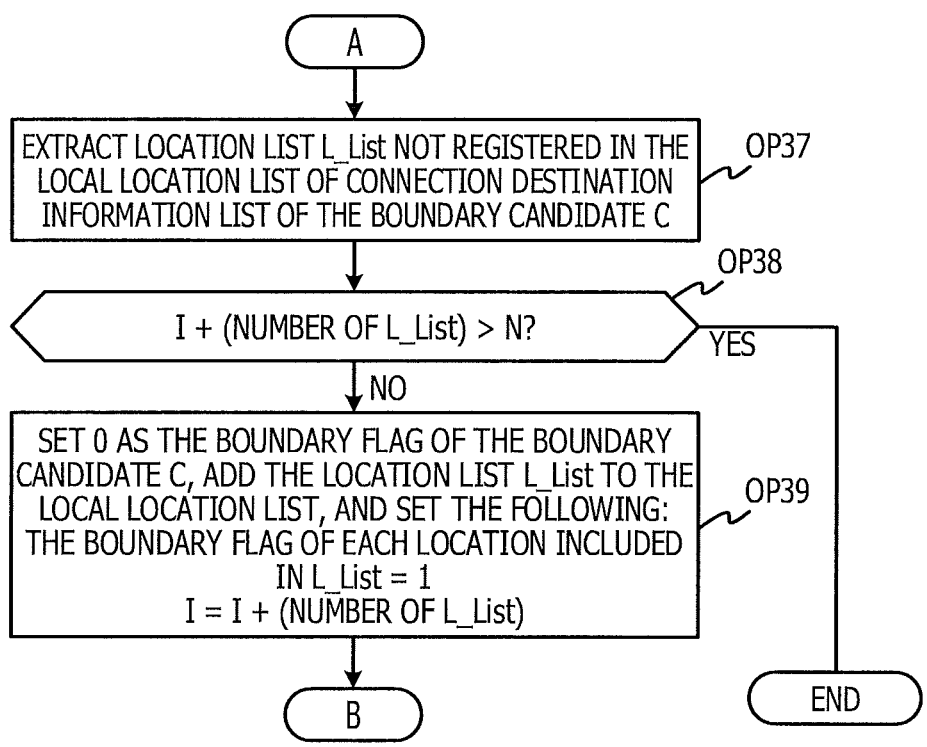
FIG. 10B is an example of a flowchart of the local location extraction processing.

FIGS. 10A and 10B are an example of a flowchart of the local location extraction processing. The processing illustrated in FIGS. 10A and 10B is equivalent to the processing in OP11 illustrated in FIGS. 7 and 8.

In OP31, the application CPU 101 inputs the current location of the portable terminal 1. The current location of the portable terminal 1 may be input by the user of the portable terminal 1, or the latest location detection processing result may be employed. Next, the processing proceeds to OP32.

In OP32, the application CPU 101 initializes the local location list. The initial state of the local location list is empty. The application CPU 101 registers the current location input in OP31 in the local location list. The registration ID of the current location in the local location list is #1. Also, the number of registrations in the local location list at the time of end of the processing in OP32 is I=1. Also, the boundary flag of the current location (list ID) within the local location list is set to "1".

In OP33, the application CPU 101 sets the maximum movement probability Pmax=0. Also, the application CPU 101 rests the boundary candidate C for initialization. Hereinafter, the processing in OP34 to OP36 is executed regarding all entries in the local location list. Hereinafter, the registration ID of the entry to be processed is indicated by a variable L (0, 1, 2, . . . , I).

In OP34, the application CPU 101 extracts the locations of connection destinations from the location of the entry of the registration ID #L from the location information database 11A. The next processing in OP35 and OP36 is executed regarding all of the extracted connection destinations.

In OP35, the application CPU 101 determines whether or not the location ID of an extracted connection destination is not registered in the local location list, and also the movement probability to the connection destination is greater than the maximum movement probability Pmax. The movement probability to the connection destination is acquired from the location information database 11A (see FIG. 6).

In the case that the location ID of the extracted connection destination is not registered in the local location list, and also the movement probability P to the connection destination is greater than the maximum movement probability Pmax, the processing proceeds to OP36. In the case that the location ID of the connection destination is registered in the local location list, or in the case that the movement probability P to the connection destination is not greater than the maximum movement probability Pmax, the processing proceeds to the next extracted connection destination, the next entry in the local location list, or OP37.

In OP36, the application CPU 101 takes the location of the entry of the registration ID #L as the boundary candidate C, and updates the maximum movement probability Pmax to the movement probability P to the connection destination. In the case that the connection destination of the entry of the registration ID #L of which the processing in OP35 and OP36 has not been completed remains, the processing proceeds to OP35, where the processing regarding the next connection destination is performed. In the case that the processing in OP35 and OP36 has been completed regarding all of the connection destinations of the entry of the registration ID #L, the processing proceeds to OP34, where the processing in OP34 to OP36 is performed regarding the entry of the next registration ID #L+1. In the case that the processing in OP34 to OP36 has been completed regarding all entries in the local location list, the processing proceeds to OP37.

In OP37, the application CPU 101 extracts a list L_List of locations not registered in the local location list of the connection destination information list (see FIG. 5) of the location of the boundary candidate C from the location information table of the location information database 11A.

In OP38, the application CPU 101 determines whether or not the number of registrations in the case that the locations extracted in OP37 have been registered in the local location list is greater than the maximum registration number N of the local location list, that is, whether or not the local location list registration number I+the number of lists L_List is greater than the N. In the case that the local location list registration number I+the number of lists L_List is greater than the N (Yes in OP38), since the number of registrations exceeds the maximum registration number N, the processing illustrated in FIGS. 10A and 10B is ended without registering the extracted locations.

In the case that the local location list registration number I+the number of lists L_List is not greater than the N (No in OP38), the application CPU 101 sets the boundary flag of the boundary candidate C to "0" and registers the locations extracted in OP37 in the local location list. The entries in the local location list of the extracted locations are set to boundary flag=1. Also, the application CPU 101 updates the number of registrations I in the local location list to the I+the number of lists L_List. Thereafter, the processing proceeds to OP33.

In the case of an example of the brief map illustrated in FIG. 2, a local location is extracted as follows. Let us say that the maximum registration number N of the local location list is 8.

First, the location 1-D is registered in the entry of the registration ID #1 in the local location list as the current location (OP31 and OP32). The number of registrations I in the local location list at this point in time is 1. Also, since there is no registration other than the location 1-D, the location 1-D at this point in time is the location of the boundary portion, so the boundary flag of the corresponding entry in the local location list is set to "1".

The locations 1-B and 1-J are extracted as the connection destinations of the location 1-D (registration DI #1) (OP34). According to FIG. 2, the movement probability to the location 1-B is 0.99, and the movement probability to the location 1-J is 0.01. In the case that the processing in OP35 and OP36 has previously been executed regarding the location 1-B, the location 1-B is not registered in the local location list, and the movement probability P=0.99 is greater than the maximum movement probability Pmax=0 (Yes in OP35). Accordingly, the location 1-D (registration ID #1) is set as the boundary candidate C (OP36). The maximum movement probability Pmax is updated to the movement probability P to the location 1-B=0.99.

Next, in the case that the processing in OP35 has been executed regarding the location 1-J, though the location 1-J is not registered in the local location list, since the movement probability P=0.01 is smaller than the maximum movement probability Pmax=0.99 (No in OP35), the processing proceeds to OP37.

Next, the locations 1-B and 1-J not registered in the local location list are extracted from the connection destinations of the location 1-B which is the boundary candidate C (OP37). In the case that the locations 1-B and 1-J have been registered in the local location list, since the number of registrations in the local location list is I=4, and does not exceed the maximum registration number N=8 (No in OP38), the boundary flag of the entry of the registration ID #1 in the local location list is set to "0", and the locations 1-B and 1-J are registered in the local location list (OP39). For example, let us say that the location 1-B is to be registered in the entry of the registration ID #2, and the location 1-J is to be registered in the entry of the registration ID #3. The locations 1-B and 1-J are the locations of the boundary portion at this point in time, and the boundary flags of these entries in the local location list are set to "1". Also, the number of registrations in the local location list at this point in time is I=3.

Next, the maximum movement probability Pmax and boundary candidate C are initialized (OP33), the processing in OP34 to OP36 is performed regarding the location 1-D (registration ID #1). Since the locations 1-B and 1-J which are the connection destinations have already been registered in the local location list (No in OP35), the boundary candidate C, maximum movement probability Pmax, and boundary flag are not updated regarding the location 1-D, and the processing proceeds to the processing of the location 1-B of the next registration ID #2.

Next, the location 1-A is extracted as the connection destination of the location 1-B (registration ID #2). The location 1-A is not registered in the local location list, and the movement probability to the location 1-A P=0.99 is greater than the maximum movement probability Pmax=0 (Yes in OP35). Accordingly, the location 1-B is set as the boundary candidate C (OP36). Also, the maximum movement probability Pmax is updated to the movement probability to the location 1-A P=0.99.

Next, the location 1-K is extracted as the connection destination of the location 1-J (registration ID #3). The location 1-K is not registered in the local location list, and the movement probability to the location 1-K P=0.01 is smaller than the maximum movement probability Pmax=0.99 (No in OP35). Accordingly, the location 1-J is not set as the boundary candidate C, and the boundary flag of the entry of the registration ID #3 in the local location list still remains in "1".

The location 1-A not registered in the local location list is extracted from the connection destinations of the location 1-B of the boundary candidate C (OP37). In the case that the location 1-A has been registered in the local location list, since the number of registrations in the local location list is I=4, and does not exceed the maximum registration number N=8 (No in OP38), the boundary flag of the entry of the registration ID #2 (location 1-B) in the local location list which is the boundary candidate C is set to "0", and the location 1-A is registered in the local location list (OP39). For example, let us say that the location 1-A is to be registered in the entry of the registration ID #4. The location 1-A is the location of the boundary portion at this point in time, and the boundary flag of the entry in the local location list is set to "1". Also, the number of registrations in the local location list is I=4 at this point in time. The locations of which the boundary flags are set to "1" at this point in time are the locations 1-J and 1-A.

Next, the maximum movement probability Pmax and boundary candidate C are initialized (OP33), and the processing in OP34 to OP36 is executed regarding the entries of the registration IDs #1 to #4. The locations of the connection destinations have already been registered in the local location list regarding the processing of the entries of the registration IDs #1 and #2 (No in OP35), the boundary candidate C, maximum movement probability Pmax, and boundary flag are not undated.

Next, the location 1-K is extracted as the connection destination of the location 1-J (registration ID #3). The location 1-K is not registered in the local location list, and the movement probability to the location 1-K P=0.01 is greater than the maximum movement probability Pmax=0 (Yes in OP35). Accordingly, the location 1-K is set as the boundary candidate C (OP36). Also, the maximum movement probability Pmax is updated to the movement probability to the location 1-K P=0.01.

Next, the location 1-E and 2-A are extracted as the connection destinations of the location 1-A (registration ID #4). The location 1-E is not registered in the local location list, and the movement probability to the location 1-E P=0.2 is greater than the maximum movement probability Pmax=0.01 (Yes in OP35). Accordingly, the boundary candidate C is updated to the location 1-A (OP36). Also, the maximum movement probability Pmax is updated to the movement probability to the location 1-E P=0.2.

The location 2-A which is the other connection destination of the location 1-A is not registered in the local location list, and the movement probability to the location 2-A P=0.79 is greater than the maximum movement probability Pmax=0.2 (Yes in OP35). Accordingly, the boundary candidate C is updated to the location 1-A (OP36). Also, the maximum movement probability Pmax is updated to the movement probability to the location 2-A P=0.79.

The locations 2-A and 1-E not registered in the local location list are extracted from the connection destinations of the location 1-A which is the boundary candidate C (OP37). In the case of having registered the locations 1-E and 2-A in the local location list, since the number of registrations in the local location list is I=6, and does not exceed the maximum registration number N=8 (No in OP38), the boundary flag of the entry of the registration ID #4 in the local location list is set to "0", and the locations 1-E and 2-A are registered in the local location list (OP39). For example, let us say that the location 1-E is to be registered in the entry of the registration ID #5, and the location 2-A is to be registered in the entry of the registration ID #6. The locations 1-E and 2-A are locations in the boundary portion at this point in time, and the boundary flags of the entries in the local location list are set to "1". Also, the number of registrations in the local location list at this point in time is I=6. The locations of which the boundary flags are "1" at this point in time are the locations 1-J, 1-E, and 2-A.

Next, the maximum movement probability Pmax and boundary candidate C are initialized (OP33), the processing in OP34 to OP36 is executed regarding the entries of the registration IDs #1 to #6. Since the connection destinations of all of the entries of the registration IDs #1, #2, and #4 have already been registered in the local location list (No in OP35), the boundary candidate C, maximum movement probability Pmax, and boundary flags are not updated.

Next, the location 1-K is extracted as the connection destination of the location 1-J (registration ID #3). The location 1-K is not registered in the local location list, and the movement probability to the location 1-K P=0.01 is greater than the maximum movement probability Pmax=0 (Yes in OP35). Accordingly, the location 1-K is set as the boundary candidate C (OP36). Also, the maximum movement probability Pmax is updated to the movement probability to the location 1-K P=0.01.

Next, the location 1-F and 1-G are extracted as the connection destinations of the location 1-E (registration ID #5). The location 1-F is not registered in the local location list, and the movement probability to the location 1-F P=0.2 is greater than the maximum movement probability Pmax=0.01 (Yes in OP35). Accordingly, the boundary candidate C is updated to the location 1-E (OP36). Also, the maximum movement probability Pmax is updated to the movement probability to the location 1-F P=0.2.

The location 1-G which is the other connection destination of the location 1-A is not registered in the local location list, and the movement probability to the location 1-G P=0.0 is smaller than the maximum movement probability Pmax=0.2 (No in OP35). Accordingly, the boundary candidate C, maximum movement probability Pmax, and boundary flag are not updated in this case.

Next, the locations 2-B, 2-E, and 3-A are extracted as the connection destinations of the location 2-A (registration ID #6). The location 2-B is not registered in the local location list, and the movement probability to the location 2-B P=0.01 is smaller than the maximum movement probability Pmax=0.2 (No in OP35). Accordingly, the boundary candidate C, maximum movement probability Pmax, and boundary flag are not updated in this case.

The location 2-E is not registered in the local location list, and the movement probability to the location 2-E P=0.01 is smaller than the maximum movement probability Pmax=0.2 (No in OP35). Accordingly, the boundary candidate C, maximum movement probability Pmax, and boundary flag are not updated in this case.

The location 3-A is not registered in the local location list, and the movement probability to the location 3-A P=0.77 is greater than the maximum movement probability Pmax=0.2 (Yes in OP35). Accordingly, the boundary candidate C is updated to the location 2-A (OP36). Also, the maximum movement probability Pmax is updated to the movement probability to the location 2-A P=0.77.

The locations 2-B, 2-E, and 3-A not registered in the local location list are extracted from the connection destinations of the location 2-A which is the boundary candidate C (OP37). In the case that the locations 2-B, 2-E, and 3-A have been registered in the local location list, the number of registrations in the local location list will become I=9, which exceeds the maximum registration number N=8 (Yes in OP38). Therefore, the local location extraction processing is ended at this point in time. Consequently, the locations 1-J, 1-D, 1-B, 1-A, 1-E, and 2-A have been registered in the local location list, and of these, the boundary flags of the locations 1-J, 1-E, and 2-A have been set to "1" (see FIG. 9).

The application CPU 101 (local location extraction unit 11) adds a notification setting for the application 14 to the local location list, creates information regarding a local location, and passes this to the microprocessor 120 along with the RSSI information of the local location, for example.

Upon completing the local location extraction processing, the application CPU 101 goes into the suspended state in the first embodiment. The location detection processing is executed by the microprocessor 120. Also, after going into the suspended state, the application CPU 101 is kept in the suspended state until the portable terminal 1 moves to a location where a notification to an application is set, or the location of the boundary portion. Thus, the power consumption of the portable terminal 1 may be reduced.

Also, in the case that local location information to be passed to the microprocessor 120 is to be created, such as processing in FIGS. 10A and 10B, the movement probability between the locations is employed, which enables a location on a route of which the probability that the portable terminal 1 will pass is high, to be extracted as a local location, enables the number of times of updating of the local location information database 16A and local RSSI information database 16B to be reduced, and enables the number of times of activation of the application CPU 101 to be reduced. Also, not only a location on a route of which the probability that the portable terminal 1 will pass is high, but also all of the connection destinations branched from the location on this route are extracted, thereby enabling occurrence of position lost due to lack of RSSI information to be suppressed even when moving to a location with a low movement probability.

The location detection processing of the portable terminal 1 has been described in the first embodiment assuming that the wireless unit 111 of WiFi is employed as a position detection sensor. However, application of the technology described in the first embodiment is not restricted to WiFi. The technology described in the first embodiment may also be applied to location detection according to any position detection sensor in which a database is employed. Also, this technology may also be applied to location detection using wireless communication technology, for example, such as 3G, LTE, WiMAX, Bluetooth, or the like. This technology may further be applied to location detection using GPS, NFC, or the like. For example, in the case of GPS, a map database is employed, and in the case of NFC, an NFC installed location database or the like is employed.

The technology described in the first embodiment is not restricted to a position detection sensor configured to detect radio waves, and may also be applied to a position detection sensor configured to detect physical amount such as acoustic waves, magnetic field, radiant rays, illuminance, or the like. Examples of a position detection sensor configured to detect acoustic waves include microphones. In the case of location detection processing employing acoustic waves, there is employed a database configured to store an association between the frequency of acoustic signals collected by a microphone, and a location. Examples of a position detection sensor configured to detect a magnetic field include magnetic sensors. In the case of location detection processing employing a magnetic field, there is employed a database configured to store an association between the strength of a magnetic field detected by a magnetic sensor, and a location.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A portable information processing device comprising:
   a sensor configured to detect physical amount which changes according to electromagnetic waves or acoustic waves for a location within predetermined space;
   a first storage configured to store an association between the information of the physical amount and location information;
   a first processor configured to execute an application program;
   a second storage of which the storage capacity is smaller than that of the first storage, configured to store a part of the associations; and
   a second processor, which is connected to the sensor, configured to acquire the current location from the information of the physical amount detected by the sensor, and the associations stored in the second storage,
   wherein the first processor extracts a part of the associations from the associations stored in the first storage according to change in the current location due to movement of the portable information processing device, and after transmitting the extracted part of the associations to the second processor, goes into a power-saving state,
   wherein the second processor updates information stored in the second storage using the part of the associations received from the first processor,
   wherein the first processor extracts and transmits the association of a location included in a predetermined range including the current location as a part of the associations, and also transmits at least information regarding a location positioned at a boundary in the predetermined range to the second processor,
   wherein the second processor determines, based on at least the information regarding a location positioned at a boundary in the predetermined range, whether or not the current location is a location where the boundary of the predetermined range is positioned, and when the current location is the location where the boundary of the predetermined range is positioned, requests the first processor from updating of a part of the associations stored in the second storage,
   wherein the first storage stores information regarding an adjacent relation between the locations,
   wherein the first processor extracts the association of a location within a predetermined range including the current location from the first storage based on the information regarding the adjacent relation, as a part of the associations,
   wherein the information regarding the adjacent relation further includes the movement probability between the locations, the movement probability of each location is compared to a maximum movement probability and, when the movement probability of a location is greater than the maximum movement probability, the location is set as a boundary candidate and the maximum movement probability is updated to the movement probability of the location, and
   wherein the first processor extracts the associations according to a predetermined number of mutually adjacent locations on a route regarding which the probability that the portable information processing device will pass is high, including the current location, as a part of the associations.

2. The portable information processing device according to claim 1,
   wherein the first processor also extracts, in addition to adjacent locations between the locations on a route regarding which the probability that the portable information processing device will pass is high, adjacent locations between the locations on this route as a part of the associations.

3. The portable information processing device according to claim 2,
   wherein the first processor registers the current location in a list, registers the transition destination of a location including a transition destination which is not registered in the list, and also, of which the movement probability is the maximum, in the list, repeats this registration processing until the number of locations registered in the list reaches a predetermined number, and extracts the association according to a location registered in the list as a part of the associations.

4. The portable information processing device according to claim 1,
wherein the second processor transmits, in the case of having acquired a location a notification to an application to be executed by the first processor is set as the current location, an activation request to the first processor, and the notification of the current location.

5. An information processing method of a portable information processing device including
a sensor configured to detect physical amount which changes according to electromagnetic waves or acoustic waves for a location within predetermined space,
a first storage configured to store an association between the physical amount and location information,
a first processor configured to execute an application program,
a second storage of which the storage capacity is smaller than that of the first storage, configured to store a part of the associations, and
a second processor, which is connected to the sensor, configured to acquire the current location from the information of the physical amount detected by the sensor, and the associations stored in the second storage, the method comprising:
extracting, by the first processor, a part of the associations from the associations stored in the first storage according to change in the current location due to movement of the portable information processing device;
going into a power-saving state by the first processor after transmitting the extracted part of the associations to the second processor;
updating, by the second processor, information stored in the second storage using the part of the associations received from the first processor;
extracting, by the first processor, and transmitting the association of a location included in a predetermined range including the current location as a part of the associations, and also transmitting at least information regarding a location positioned at a boundary in the predetermined range to the second processor; and
determining, by the second processor, based on at least the information regarding a location positioned at a boundary in the predetermined range, whether or not the current location is a location where the boundary of the predetermined range is positioned, and when the current location is the location where the boundary of the predetermined range is positioned, requesting the first processor from updating of a part of the associations stored in the second storage,
wherein the first storage stores information regarding an adjacent relation between the locations,
wherein the first processor extracts the association of a location within a predetermined range including the current location from the first storage based on the information regarding the adjacent relation, as a part of the associations,
wherein the information regarding the adjacent relation further includes the movement probability between the locations, the movement probability of each location is compared to a maximum movement probability and, when the movement probability of a location is greater than the maximum movement probability, the location is set as a boundary candidate and the maximum movement probability is updated to the movement probability of the location, and
wherein the first processor extracts the associations according to a predetermined number of mutually adjacent locations on a route regarding which the probability that the portable information processing device will pass is high, including the current location, as a part of the associations.

6. A non-transitory computer-readable storage medium storing an information processing program causing a computer including
a sensor configured to detect physical amount which changes according to electromagnetic waves or acoustic waves for a location within predetermined space,
a first storage configured to store an association between the information of the physical amount and location information,
a first processor configured to execute an application program,
a second storage of which the storage capacity is smaller than that of the first storage, configured to store a part of the associations, and
a second processor, which is connected to the sensor, configured to acquire the current location from the information of the physical amount detected by the sensor, and the associations stored in the second storage,
to execute a process comprising:
extracting, by the first processor, a part of the associations from the associations stored in the first storage according to change in the current location due to movement of the portable information processing device;
going into a power-saving state by the first processor after transmitting the extracted part of the associations to the second processor;
updating, by the second processor, information stored in the second storage using the part of the associations received from the first processor;
extracting, by the first processor, and transmitting the association of a location included in a predetermined range including the current location as a part of the associations, and also transmitting at least information regarding a location positioned at a boundary in the predetermined range to the second processor; and
determining, by the second processor, based on at least the information regarding a location positioned at a boundary in the predetermined range, whether or not the current location is a location where the boundary of the predetermined range is positioned, and when the current location is the location where the boundary of the predetermined range is positioned, requesting the first processor from updating of a part of the associations stored in the second storage,
wherein the first storage stores information regarding an adjacent relation between the locations,
wherein the first processor extracts the association of a location within a predetermined range including the current location from the first storage based on the information regarding the adjacent relation, as a part of the associations,
wherein the information regarding the adjacent relation further includes the movement probability between the locations, the movement probability of each location is compared to a maximum movement probability and, when the movement probability of a location is greater than the maximum movement probability, the location is set as a boundary candidate and the maximum movement probability is updated to the movement probability of the location, and wherein the first processor extracts the associations according to a predetermined number of mutually adjacent locations on a route regarding which the probability that the portable information processing device will pass is high, including the current location, as a part of the associations.

* * * * *